United States Patent [19]

Ronn et al.

[11] 4,328,303

[45] May 4, 1982

[54] PREPARATION OF METAL CONTAINING POLYMERIC MATERIAL VIA LASER CHEMISTRY

[75] Inventors: Avigdor M. Ronn, Great Neck, N.Y.; Philip Bernstein, Glen Ridge; Harvey C. Branch, Ramsey, both of N.J.; James P. Coffey, Warwick, N.Y.

[73] Assignee: Research Foundation of City University of New York, New York, N.Y.

[21] Appl. No.: 154,960

[22] Filed: May 30, 1980

[51] Int. Cl.³ ............................................. G03C 5/04
[52] U.S. Cl. ................................... 430/290; 430/269; 430/292; 430/346; 430/363; 430/495; 430/945
[58] Field of Search ............... 430/290, 292, 945, 269, 430/346, 363, 495

[56] References Cited

U.S. PATENT DOCUMENTS

| | | | |
|---|---|---|---|
| 3,811,885 | 5/1974 | Merchant et al. | 430/346 |
| 3,910,454 | 11/1975 | Thompson | 430/945 |
| 3,961,513 | 6/1976 | Eames | 430/945 |
| 4,139,853 | 2/1979 | Chekiere et al. | 430/290 |

*Primary Examiner*—Jack P. Brammer
*Attorney, Agent, or Firm*—Raymond J. Kenny; Ewan C. MacQueen

[57] ABSTRACT

The production of polymeric bodies having included, isolated areas of fine metal or metal oxide particles dispersed therein by mixing a metal compound with a polymer, converting the resulting mixture to a desired shape and irradiating selected areas of the shape with laser light to decompose the metal compound in the irradiated areas.

1 Claim, No Drawings

PREPARATION OF METAL CONTAINING POLYMERIC MATERIAL VIA LASER CHEMISTRY

FIELD OF THE INVENTION

The invention relates to the production of like polymeric bodies having included, isolated areas of fine metal or metal oxide particles disposed therein which are useful, inter alia, as data storage media.

There is an extensive art pertaining to the production of magnetic recording media such as tape, etc. by conventional means but the present invention is directed to the use of laser induced chemistry to provide in a polymeric body such as a tape included, isolated areas of fine metal or metal oxide particles. No known art has employed laser induced chemistry for such a purpose.

The invention is directed to the production of polymeric bodies containing included, isolated areas of fine metal or metal oxide particles which comprises mixing a metal compound with the polymer, forming the resulting mixture into a desired shaped, e.g., a tape, etc., and irradiating selected areas of the shape with laser light to decompose the metal compound to finely divided metal or metal oxide.

The polymers which may be employed in accordance with the invention may be any of the common materials employed to produce transparent or translucent plastic shapes such as sheet. Thus, the polymer may be polyethylene, polypropylene, polystyrene, ABS, polyvinyls, nylon, polyester, acrylic, polyamide, polycarbonate, epoxy, silicone, polyurethane, etc. Most conveniently, thermoplastic resins are employed. The capability of the polymer to transmit light is a requirement since the invention contemplates decomposition of a metal-containing compound to provide finely-divided metal or metal oxide at desired locations within the body of polymeric material. Generally, the polymer and associated materials such as plasticizers and the like will be selected to be compatible in processing characteristics to the metal compound to be employed. For example, the polymer should be capable of being processed to the desired physical form at temperatures, pressures and other conditions which will avoid premature decomposition of the metal compound being processed therewith. The polymeric body containing the metal compound can have any of the kinds of shapes into which polymeric materials are worked. The polymeric body may be porous, cellular or solid.

Metal-organic compounds are desirably employed in accordance with the invention when finely divided metal particles are desired at selected areas of the polymeric body. Such compounds preferably are characterized by a metal-carbon bond and may be exemplified by metal carbonyls, metal bis-cyclopentadienyl compounds, mixed arenes, arene-carbonyl metal complexes, metal arenes, etc. Exemplary transition metal compounds include ferrocene $[Fe(C_5H_5)_2]$, nickel carbonyl $[Ni(C0)_4]$, bis-benzene chromium $[(C_6H_6)_2Cr]$. The metal compounds must have sufficient stability to withstand mixing with the polymer without decomposition to metal, while on the other hand, being decomposable to metal when irradiated with the laser beam. Many of the operative metal compounds can be regarded as containing the metal moiety in a zero-valent state. Oxide deposits can be produced within the polymeric body by admixing compounds such as chromyl chloride, $CrO_2Cl_2$, with the selected polymer. Metal compounds decomposable to oxides will contain metal in ionic form.

Mixing of the polymer and the metal compound and conversion of the mixture to the desired product form is accomplished in accordance with standard procedures developed in the plastics industry for handling polymers. Usually the mixture will be converted into the form of a sheet, strip or ribbon by, for example, rolling, extrusion, coating on a substrate etc. It is important to provide an essentially uniform dispersion of the metal compound within the polymeric host body. The mixture should contain about 0.1% to about 25% or up to 50% metal as the metal compound.

Laser development of sites within the polymeric body containing fine metal or oxide particles provides a sharp contrast between areas which are insulating and areas which are conductive or magnetizable or visually differentiated or non-transparent. Use of the laser beam permits focusing of the beam to cover the desired area in a single pulse, together with the capability of delivering sufficient energy in a single pulse to decompose at least a portion of the metal compound within the area defined by the laser beam. The laser can also permit rapid scanning of a surface area in response to programmed electrical or electronic impulses so as to generate a pattern of developed dots or other shapes adapted to provide the desired final product, e.g., magnetic tape, printed circuit, half-tone print, written message, etc.

The $CO_2$ TEA laser may be used. In fact, any laser may be used provided the wavelength of the light emitted thereby is not absorbed to any excessive extent by the polymeric host material. The laser beam may have a wavelength which is absorbed by the metal compound admixed with the polymeric host material but operation in a resonant mode is not essential. The maximum power employed by the beam must be limited to avoid physical damage to the polymeric body. The extent of conversion of the admixed metal compound to opaque metal or oxide at a particular exposed area of the polymer can be controlled by the amount of laser energy delivered in each pulse or by repeated pulsing of the laser to the same exposed area. The amount of metal compound admixed also affords control of the density or opacity of individual exposed areas. Exposure to provide development of a uniformly distributed array of dots having varying densities thus can lead to printing of a half-tone print. Conversion of electronic signals to light signals adapted to scan an area can readily lead to production of a printed message. Many other illustrations of advantages of the invention become apparent.

An example will now be given

A mixture of polyethylene beads with 5 weight percent ferrocene was prepared by warm milling at 60° C. The mixture was converted to sheets having thicknesses ranging from 0.12 to 2 millimeters in thickness. Laser irradiation of the sheets using $CO_2$ TEA laser pulses of 6–8 joules, at a wavelength of 10.6 micro meters and soft focused to spots 0.5 to 1 centimeter in diameter produced black spots in the irradiated areas which were found to contain submicron iron particles by scanning electron microscopy and energy dispersive X-ray analysis. The cyclopentadiene resulting from ferrocene decomposition diffused out of the polymer as did the ferrocene from the non-irradiated areas after 12 days. The example demonstrates in situ creation of metal particles dispersed in selected areas of a polymeric sheet, with such areas being insulated by surrounding polymeric areas containing no metal particles. As indicated by the Example, it is advantageous that the metal-organic compound and the organic decomposition product thereof be removable from the polymeric host by diffusion so as to avoid blistering or other mechanical damage of the polymer.

In another instance, a polyethylene foam having closed porosity was infiltrated with iron pentacarbonyl, a liquid, by diffusion. Irradiation of selected areas of the infiltrated material with laser light at 10.6 micro meters wavelength and a fluence at selected spots of 1.5 joules/cm$^2$ provided a black deposit of submicron iron particles at the irradiated areas.

While the invention has been described hereinbefore in terms of polymeric bodies containing a metal compound decomposable by laser light to ultrafine metal or metal oxide particles, it can be seen that generically the invention is directed to the formation of bodies made of material or coated with material transparent to laser light but having distributed therein at predetermined locations the reaction product resulting from exposure to laser light of another material affected by or decomposed by laser light so as to produce in the portions or areas of said body exposed to laser light discrete areas having properties distinct from the properties of unexposed areas of said body. The differences can be manifested in terms of one or more of opacity, conductivity, color, magnetizability, etc. For example, layered coatings containing ingredients decomposable to colored compounds of the requisite component colors needed for color printing and responsive to laser light can be used to produce color prints. Single or multiple layers of microballoons or of various gels containing compounds responsive to laser light and applied to a substrate could be utilized to produce respectively black-and-white prints akin to half-tones or three-or-four color prints. Such a capability could be utilized in communications since equipment exists to transform electrical or electronic signals into commands governing a laser so as to record printed matter and prints transmitted from a distant source. It is to be pointed out that the term "light" as used herein applies to the spectrum of electromagnetic radiation extending from, and including, the ultraviolet to, and including, the infrared.

The products provided by the present invention have utility as data storage media, such as magnetic tape, having high resolution, minimal cross-talk and maximization of the remanence loop stemming from essentially complete physical separation of magnetic and nonmagnetic domains. The invention can be utilized to produce magnetic diaphragms, filters and other articles made possible by the capability of depositing finely-divided, e.g. sub-micron metal or metal oxide particles within a polymeric host body.

While in accordance with the provisions of the statutes, there is illustrated and described herein specific embodiments of the invention, those skilled in the art will understood that changes may be made in the form of the invention covered by the claims and that certain features of the invention may sometimes be used to advantage without a corresponding use of the other features.

We claim:

1. The method for producing polymeric bodies made of a light-transmitting polymer having at predetermined locations therein fine opaque metal or metal oxide particles which comprises providing a shaped polymeric body having substantially uniformly distributed therethrough a metal-organic compound selected from the group consisting of carbonyls, bis-cyclopentadienyls, arenes, mixed arenes, arene-carbonyl complexes and ferrocene and irradiating with laser light selected areas of said shaped polymeric body, said laser light irradiation acting within said selected areas to decompose at least a portion of said metal-organic compound to provide in said irradiated areas opaque metal or metal oxide particles.

* * * * *